US008670303B2

(12) United States Patent
Balasubramanian et al.

(10) Patent No.: US 8,670,303 B2
(45) Date of Patent: Mar. 11, 2014

(54) MULTIPLE-FAULT-TOLERANT ETHERNET NETWORK FOR INDUSTRIAL CONTROL

(75) Inventors: Sivaram Balasubramanian, Solon, OH (US); Anatoly Moldovansky, Pepper Pike, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 327 days.

(21) Appl. No.: 13/253,466

(22) Filed: Oct. 5, 2011

(65) Prior Publication Data

US 2013/0088952 A1  Apr. 11, 2013

(51) Int. Cl.
*G06F 11/07* (2006.01)
*G06F 11/14* (2006.01)

(52) U.S. Cl.
USPC .......................... 370/218; 370/221; 370/225

(58) Field of Classification Search
USPC ......... 370/216–228, 241–250, 419–420, 463; 709/239, 249–251
See application file for complete search history.

(56) References Cited

U.S. PATENT DOCUMENTS

| | | | | |
|---|---|---|---|---|
| 6,173,411 | B1 * | 1/2001 | Hirst et al. | 714/4.3 |
| 6,229,538 | B1 * | 5/2001 | McIntyre et al. | 715/734 |
| 6,308,282 | B1 * | 10/2001 | Huang et al. | 714/4.3 |
| 6,581,166 | B1 | 6/2003 | Hirst et al. | |
| 6,901,443 | B1 | 5/2005 | Huang et al. | |
| 6,934,880 | B2 * | 8/2005 | Hofner | 714/10 |
| 7,110,353 | B1 * | 9/2006 | Deschaine et al. | 370/219 |
| 7,599,285 | B2 * | 10/2009 | Zhou et al. | 370/217 |
| 7,817,538 | B2 | 10/2010 | Balasubramanian et al. | |
| 7,911,940 | B2 * | 3/2011 | Shei | 370/219 |
| 2002/0046357 | A1 | 4/2002 | Hunag et al. | |
| 2002/0131362 | A1 | 9/2002 | Callon | |
| 2005/0281191 | A1 * | 12/2005 | McGee et al. | 370/216 |
| 2006/0067208 | A1 | 3/2006 | Hoga et al. | |
| 2006/0245454 | A1 | 11/2006 | Balasubramanian et al. | |
| 2006/0268682 | A1 * | 11/2006 | Vasseur | 370/216 |
| 2006/0291378 | A1 | 12/2006 | Brotherston et al. | |
| 2007/0076590 | A1 * | 4/2007 | Galpin et al. | 370/216 |
| 2008/0215910 | A1 * | 9/2008 | Gabriel et al. | 714/4 |
| 2008/0275975 | A1 * | 11/2008 | Pandey et al. | 709/223 |

(Continued)

FOREIGN PATENT DOCUMENTS

| | | |
|---|---|---|
| EP | 0981226 A1 | 2/2000 |
| EP | 1901482 A1 | 3/2008 |

(Continued)

OTHER PUBLICATIONS

Extended European Search Report dated Feb. 13, 2013; Application No. 12187403.6—(7 Pages).

(Continued)

*Primary Examiner* — Thai Hoang
(74) *Attorney, Agent, or Firm* — Boyle Fredrickson, S.C.

(57) ABSTRACT

Fault-tolerant Ethernet is provided through the use of special interfaces providing end-devices with duplicate ports that may be alternatively enabled with the same network address in the event of a fault detected by loss of the message from a beacon device. Unidirectional network errors in the direction from the end-device to the beacon devices are detected through a path check message from the end-device to the beacon device. Multiple faults may be accommodated without network interruption by adding top-level switches without increasing the number of ports on the end-devices by cross connecting a lowest level of switch.

20 Claims, 16 Drawing Sheets

(56) References Cited

U.S. PATENT DOCUMENTS

2010/0097926 A1* 4/2010 Huang et al. ............... 370/219
2010/0290339 A1  11/2010 Balasubramanian et al.
2010/0296390 A1* 11/2010 Boyina et al. .............. 370/216

FOREIGN PATENT DOCUMENTS

| EP | 2290878 A1 | 3/2011 |
| WO | WO 99/21322 | 4/1999 |
| WO | WO 02/098059 | 12/2002 |
| WO | WO 2004/071010 | 8/2004 |

OTHER PUBLICATIONS

European Search Report for EP Application No. 07114417.4-2416, dated Jan. 11, 2008, Michael Nold, EPO, Munich, Germany.
Extended European Search Report for EP Application No. 10013012.9—2416, dated Jan. 26, 2011, Michael Nold, EPO, Munich, Germany.

* cited by examiner

MULTIPLE-FAULT-TOLERANT ETHERNET NETWORK FOR INDUSTRIAL CONTROL

BACKGROUND OF THE INVENTION

This invention relates generally to fault-tolerant electronic communication networks, and, in particular, to a fault-tolerant network that operates rapidly to correct faults occurring when network components fail and which is suitable for real-time industrial control.

Industrial controllers are special-purpose computers that provide for real-time, highly reliable control of manufacturing equipment and machines and processes. Typically, an industrial controller executes a stored program to read inputs from the machine or process through sensors connected to the industrial controller through a set of input/output (I/O) circuits. Based on those inputs, the industrial controller generates output signals that control the machine or process through actuators or the like.

Often, the components of the industrial control system will be distributed throughout a factory and will therefore communicate over a specialized communication network that provides for high-speed operation (to allow real time control) with specialized protocols to ensure that data is reliably and predictably transmitted.

Desirably, the components of an industrial control system might be interconnected using common network components, for example, commonly available Ethernet network components. Such an ability could cut the costs of establishing and maintaining the network and in some cases would allow the use of existing network infrastructures. In addition, the ability to use a common network, such as Ethernet, could facilitate communication with devices outside of the industrial control system or that are not directly involved in the control process.

One obstacle to the adoption of Ethernet and similar standard networks is that they are not fault-tolerant, that is, failure in as little as one network component can cause the network to fail—an unacceptable probability for an industrial control system where reliability is critical.

The prior art provides several methods to increase the fault tolerance of Ethernet and similar networks. A first approach is to use a ring topology where each end-device (node) is connected to the other nodes with a ring. Failure of one component or media segment in the ring still provides a second path between every node. A drawback is that multiple faults (e.g. the failure of two segments of media) cannot be accommodated.

A second approach equips each node with software "middleware" that controls the connection of the node to one of two or more different networks. In the event of component or media failure, the middleware changes the local network interface to transmit and receive messages on the back-up network using a new Ethernet address. This approach can tolerate multiple faults, but the time necessary to reconfigure the network can be as much as 30 seconds. An additional problem with this latter approach is that multiple independent networks are needed (one for primary use and one for backup) which can be difficult to maintain, inevitably having differences in configuration and performance.

In a third approach, a single network with two or more redundant network infrastructures is used and each device is provided with multiple ports, and each port is connected to a redundant infrastructure of that network. Again, middleware in each device is provided with alternate paths through multiple infrastructures to all other devices in the network.

This need to reconfigure each node when there is a network failure fundamentally limits the speed with which network failures may be corrected in these approaches both because of the need for complex software (middleware) to detect the failure and coordinate address or path status changes, and because of the time required for communication with other nodes on the network.

For this reason a fourth approach has been developed as described in U.S. Pat. No. 7,817,538 entitled: Fault-Tolerant Ethernet Network" issued Oct. 19, 2010 assigned to the assignee of the present invention and hereby incorporated by reference. This approach uses end-devices with multiple ports having the same address. A hardware system monitoring a beacon signal rapidly switches ports in the event of a failure substantially eliminating the time required for the network to relearn new addresses for network devices. The detected failure triggers a "learning update" message to other network components to facilitate learning new paths for the network devices.

This approach may be expanded to handle multiple faults affecting a single end-device by increasing the number of ports on the end-devices, for example, from two to three. With three ports, double faults may be accommodated; with four ports triple faults may be accommodated. Etc. As a practical matter, the additional hardware costs of adding additional ports to every end-device may not be justified beyond two ports.

SUMMARY OF THE INVENTION

The present inventors have determined that network fault tolerance may be improved by increasing the number of critical network backbone switches at the top-level without necessarily increasing the number of ports on the end-devices. This allows multiple faults to be accommodated in a more scalable fashion. In addition, the inventors have determined that a fault causing unidirectional loss of signal, opposite to the direction of beacon message flow, may go undetected for an extended period of time, particularly when it is associated with the unused port of an end-device. Accordingly, the present invention provides addition of a "path check" protocol and/or a periodic swapping of the active and backup ports based on a time interval rather than the occurrence of a fault. Improved network reliability is thus obtained.

Specifically, the invention provides in one embodiment a fault-tolerant industrial control device having a host processor, providing data to be communicated between the control device and an industrial control network, and a network communication circuit communicating between the host processor and at least two ports on the control device. The ports use a single MAC address and are connectable to different network media of the industrial control network that may lead to different switches. The communication circuit switchably connects the host processor from a first of the ports to a second of the ports upon occurrence of a fault affecting a first of the ports without changing the MAC address. Both ports may concurrently detect network-level faults regardless of which is switchably connected to the end-device by monitoring regular signals from at least one beacon device communicating on the industrial control network with the control device. The network communication circuit periodically transmits a path check request message to the beacon device and triggers the fault if a responding path check response is not received from the beacon device in a predetermined interval.

It is thus a feature of at least one embodiment of the invention to detect unidirectional network failures in this type of redundant network.

The network communication circuit may further transmit a learning update signal from an active port after a fault, the learning update signal indicating to other devices on the industrial control network that their routing tables should be updated.

It is thus a feature of at least one embodiment of the invention to provide for extremely rapid recovery from unidirectional network failures as is required for industrial control situations.

The network communication circuit may receive signals from multiple beacon devices and may change the target beacon device receiving the periodically transmitted path check request message according to a predetermined sequence.

It is thus a feature of at least one embodiment of the invention to address the one-to-many relationship of end-devices to beacons by multiplexing the path check request message allowing a trade-off between detection speed and bandwidth usage.

The network communication circuit may periodically switch communication between the first port and second port without occurrence of a fault.

It is thus a feature of at least one embodiment of the invention to prevent hidden unidirectional network failures occurring on an unused port.

The network communication circuit may periodically transmit the path check request message at a period longer than a period of regular signals from the beacon device.

It is thus a feature of at least one embodiment of the invention to allow a flexible tailoring between detection speed and bandwidth usage.

The predetermined interval may include at least two repetitions of the path check request message.

It is thus a feature of at least one embodiment of the invention to provide an ability to adjust a fault level threshold by performing multiple retries.

The network communication circuit includes a hardware circuit switching between ports.

It is thus a feature of at least one embodiment of the invention to provide for a protocol that may be handled in hardware for extremely fast response speeds.

These particular objects and advantages may apply to only some embodiments falling within the claims and thus do not define the scope of the invention.

DETAILED DESCRIPTION OF THE PREFERRED EMBODIMENT

I. An Industrial Control System

Figure 1:
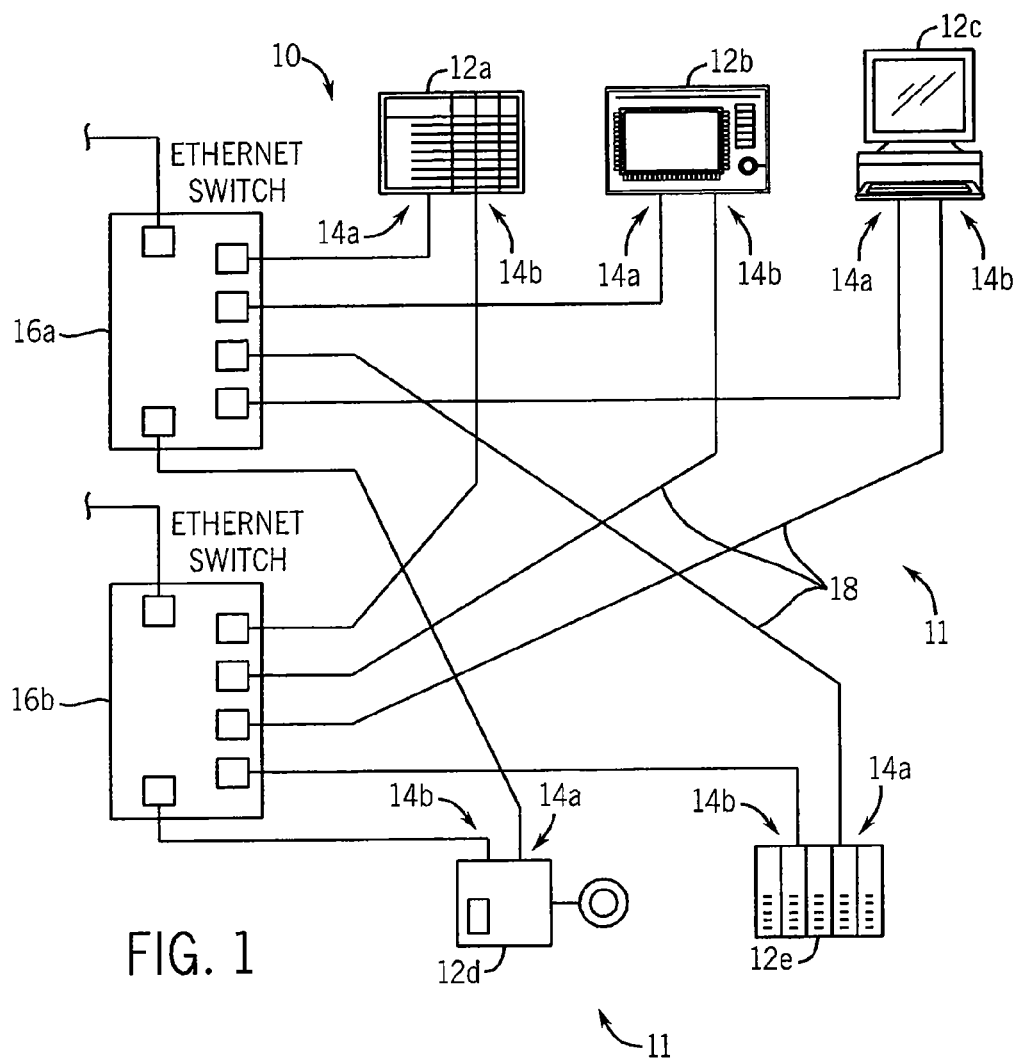
FIG. 1 is a block diagram of an industrial control system having controller and other end-devices connected as nodes on an Ethernet network, each node communicating with multiple Ethernet switches.

Referring now to FIG. 1, an industrial control system 10 may include a number of end-devices 12a-12e, each having two connections 14a and 14b via an Ethernet interface circuit 20 (not shown in FIG. 1) communicating respectively with different switches 16a and 16b through independent network media 18.

Together, the switches 16, the network media 18, and the Ethernet interface circuits 20 provide a fault-tolerant network 11, as will be described below.

The end-devices 12a-12e may be any industrial control device such as a programmable logic controller (end-device 12a), a human machine interface (end-device 12b), a standard personal computer (end-device 12c), a motor controller (end-device 12d), or an input/output rack (end-device 12e).

Each of the switches 16a and 16b may be standard Ethernet switches of a type known in the art. To the extent that the switches 16 may have IGMP snooping and filtering of Ethernet multicast addresses, this feature may be preferably deactivated to allow these switches to work more rapidly with the present invention. To the extent that the switches 16 may have "learning" and filtering of Ethernet unicast addresses, preferably, switches may provide for a configurable aging mechanism for learned addresses; however, this is not required.

The network media 18 may be, for example, electrical cable, optical fiber or wireless transmitter/receiver pairs, or the like.

II. Enabling Background from U.S. Pat. No. 7,817,538

A. The Fault-Tolerant Interface Circuit

Figure 2:
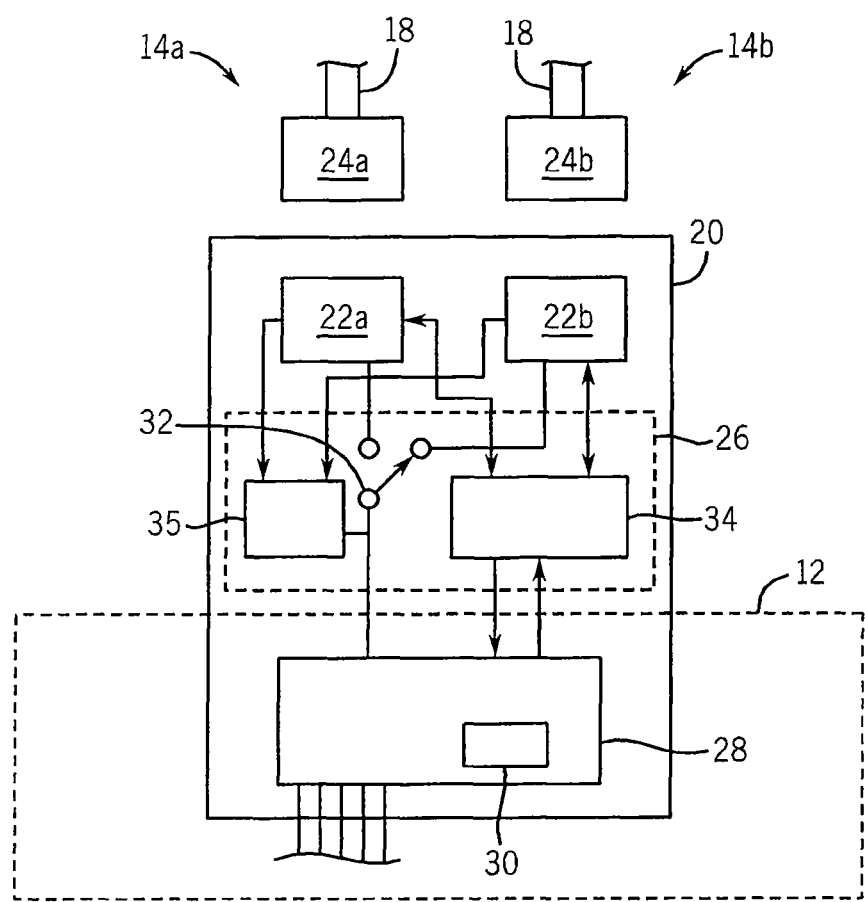
FIG. 2 is a block diagram of a communication circuit employed by the end nodes of FIG. 1 providing two ports using the same address to connect to the multiple switches and showing circuitry for switching between the two ports.

Referring now to FIG. 2, as mentioned above, each of the end-devices 12 may include an Ethernet interface circuit 20 providing the two connections 14a and 14b to the rest of the network 11. The connections 14a and 14b are realized through two standard physical ports 22a and 22b accepting respectively connectors 24a and 24b attached to network media 18.

The physical ports 22a and 22b are connected to a hardware switching circuit 26, such as may be implemented, for example, using a field programmable gate array (FPGA) and/or an application-specific integrated circuit (ASIC), that provides a communication between one or the other of the ports 22a and 22b with a host microprocessor 28. In this regard, the switching circuit 26 may include a multi-line port selector 32 switching data flow from either port 22a or port 22b, depending on the state of the port selector 32, to a host microprocessor 28. A logic circuit 34, being part of the switching circuit 26, controls the port selector 32 according to state machine that generally detects faults and switches between the ports 22a and 22b. At any given time, port selector 32 enables only one port 22a and disables the other port 22b or vice versa. All communication flows only through the enabled port 22.

The host microprocessor 28 typically executes a program implementing specific features of the end-device 12. Importantly, the host microprocessor 28 holds a single media-access control layer (MAC) network address 30 that is used by a single activated one of the ports 22a and 22b as a network address when they are alternatively enabled.

In the preferred embodiment, the host microprocessor 28 authorizes the logic circuit 34 to switch between the ports 22a and 22b after the logic circuit 34 provides an interrupt to the host microprocessor 28 when a fault or other significant network event has occurred. The switching authorization by the host microprocessor 28 requires the execution of very little code so that the host microprocessor 28 may reconfigure the ports with a delay of less than 10 microseconds. During this short switching time, some packets will be lost but higher-level network protocols will function correctly to handle these lost packets just like packets lost due to other network errors. It is unlikely that duplicate packets will be received during this delay period, but if a few duplicate packets are received, they will be detected by higher-level network protocols.

Referring still to FIG. 2, the logic circuit 34 may directly detect faults by two means depending on whether the fault is "local" to the Ethernet interface circuit 20 or "remote", that is, separated from the Ethernet interface circuit 20 by at least one switch 16.

For detecting "remote" faults, the logic circuit 34 preferably includes a beacon generator/detector 35 either providing a means for receiving beacon packets simultaneously on both of ports 22a and 22b (as will be described) or transmitting beacon packets, when so configured, on a single activated one of ports 22a and 22b. In this mode, beacon packets will be detected at both of the ports 22a and 22b regardless of which one is active for data transfer.

Generally, when the beacon generator/detector 35 detects failure of any beacon packet to arrive within a predefined timeout period at the active one of ports 22a or 22b from a remote beacon in the network, the particular port failing to detect the beacon packet is declared to be in fault mode. Upon this occurrence, the logic circuit 34 interrupts the host microprocessor 28, and the host microprocessor 28 instructs the logic circuit 34 to switch to the other port 22 (assuming it has not previously faulted). Similarly, when a faulted port 22 becomes enabled again, it may be restored by the host microprocessor 28 upon interruption by the logic circuit 34. Correct location of one or more beacons thus allows each Ethernet interface circuit 20 to detect remote faults removed from the given interface circuit 20 and the switch 16 to which it connects directly.

The logic circuit 34 may also detect "local" faults, between the Ethernet interface circuit 20 and the closest switch 16 using the mechanisms of IEEE 802.3 standard. These faults are communicated to the host microprocessor 28 like the "remote" faults and treated in a like manner to trigger a change of ports 22a and 22b.

When the beacon generator/detector 35 is configured as a generator it provides a transmission of a beacon packet at a regular interval to aid in the detection of remote faults as described above. The beacon packets are transmitted at highest priority on the network using IEEE 802.3 priority tagged frames, which the switches 16 are configured to support.

In the preferred embodiment, the generator/detector 35 combines these two functions of beacon packet generation and beacon packet detection for efficiency, however, it will be recognized from the following description that the beacon generation function can be performed by a separate device. In the preferred embodiment, the switching circuit 26 communicates with the host microprocessor 28 and the ports 22a and 22b using IEEE 802.3 medium independent interface (MII) bus. The address and data buses of the host microprocessor 28 allows configuration of the logic circuit 34 by the host microprocessor 28 using memory-mapped registers and may provide for the transmission of interrupt signals. The switching circuit 26 may also provide for multi-cast address filtering so that the host microprocessor 28 is not inundated with multi-cast traffic resulting from the disabling of IGMP snooping and filtering in the switches 16.

B. A Fault-Tolerant Network

Figure 3:
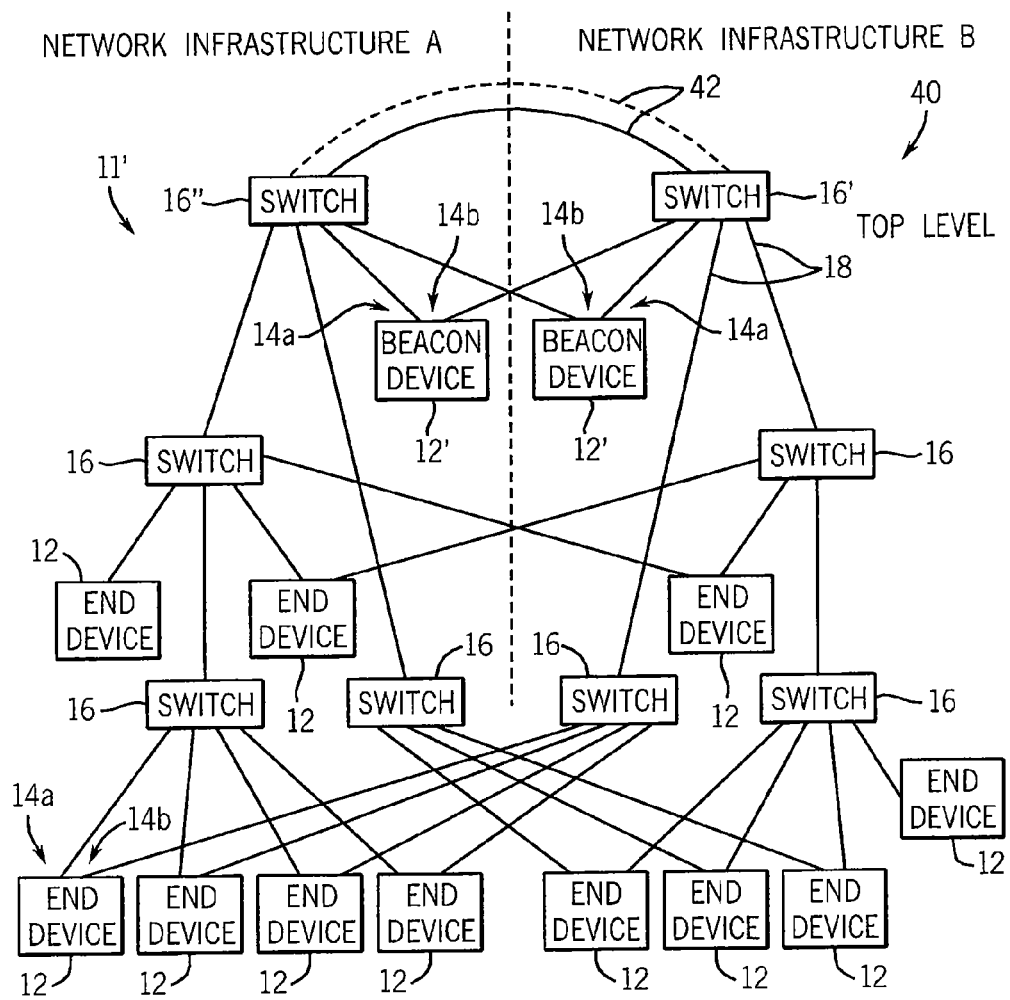
FIG. 3 is a diagram of an Ethernet network configured for connecting multiple end-devices redundantly to each of two different backbone switches at a top-level.

Referring now to FIG. 3, although the present invention may work with any network topology providing at least some redundancy, ideally the network is set up for symmetrical redundancy or asymmetrical redundancy with non-overlapping sub-trees, where each end-device 12 has one of its connections 14a and 14b connected directly to switches 16 in different ones of two network infrastructure: (1) Network Infrastructure A and (2) Network Infrastructure B. Multiple layers of switches 16 may be employed in each network infrastructure with all connections in each network infrastructure leading to one or the other of two switches 16' and 16" forming a network infrastructure top-level 40. Top-level switches 16' and 16" communicate directly with each other over a backbone 42 incorporating two or more links providing link aggregation capability per IEEE 802.3 Part III "Carrier sense multiple access with collision detection (CSMA/CD) Access Method and Physical Layer Specifications, 2002". With link aggregation capability, traffic is shared among the links between the two top-level switches 16' and 16" so that failure of one line of the backbone 42 will not prevent such communication. With such an arrangement, network infrastructure A and network infrastructure B form a single logical network.

The network 11 so described provides redundant connections between each end-device 12 and switches 16 in both of the Network Infrastructure A and Network Infrastructure B, and ensures highly reliable connections between Network Infrastructure A and Network Infrastructure B through the top-level switches 16' and 16". Generally the exact number and level of switches 16 will be dependent on the application requirement. The invention contemplates that extremely large networks may be constructed. For example, with three levels of switches, using eight local links plus one uplink per switch, a network can be constructed with greater than five hundred nodes, and with 24 local links plus one uplink per switch, more than 10,000 nodes.

In the preferred embodiment, two end-devices 12' are designated solely to provide for beacon packets (via the beacon generator/detector 35) and the remaining end-devices 12 are configured to detect the beacon packets so transmitted. The two end-devices 12' transmitting beacon packets transmit these packets out of one of their connections 14a and 14b preferably so that one set of beacon packets from one end-device 12' goes directly to top-level switch 16' and the other set of beacon packets from the other end-device 12' goes directly to top-level switch 16".

As described above, the beacon end-devices 12' broadcast a short beacon packet on the network periodically. The periodicity of the beacon packet transmission is determined by a worst-case delay for the beacon packet to travel from a beacon end-device 12' to the farthest end-device 12 for the specific network 11. This periodicity is programmed into each Ethernet interface circuit 20 so that a timeout measurement may be used by the beacon detectors to determine that the beacon packets have been lost and to declare a fault on the ports 22a or 22b. Normally the time out period is slightly more than twice the worst-case delay to guard against false triggering. For example, for a three-switch level system, such as is shown, the beacon period may be 450 microseconds and the timeout period 950 microseconds, slightly more than two beacon periods.

C. Example Fault Conditions

Figure 4:
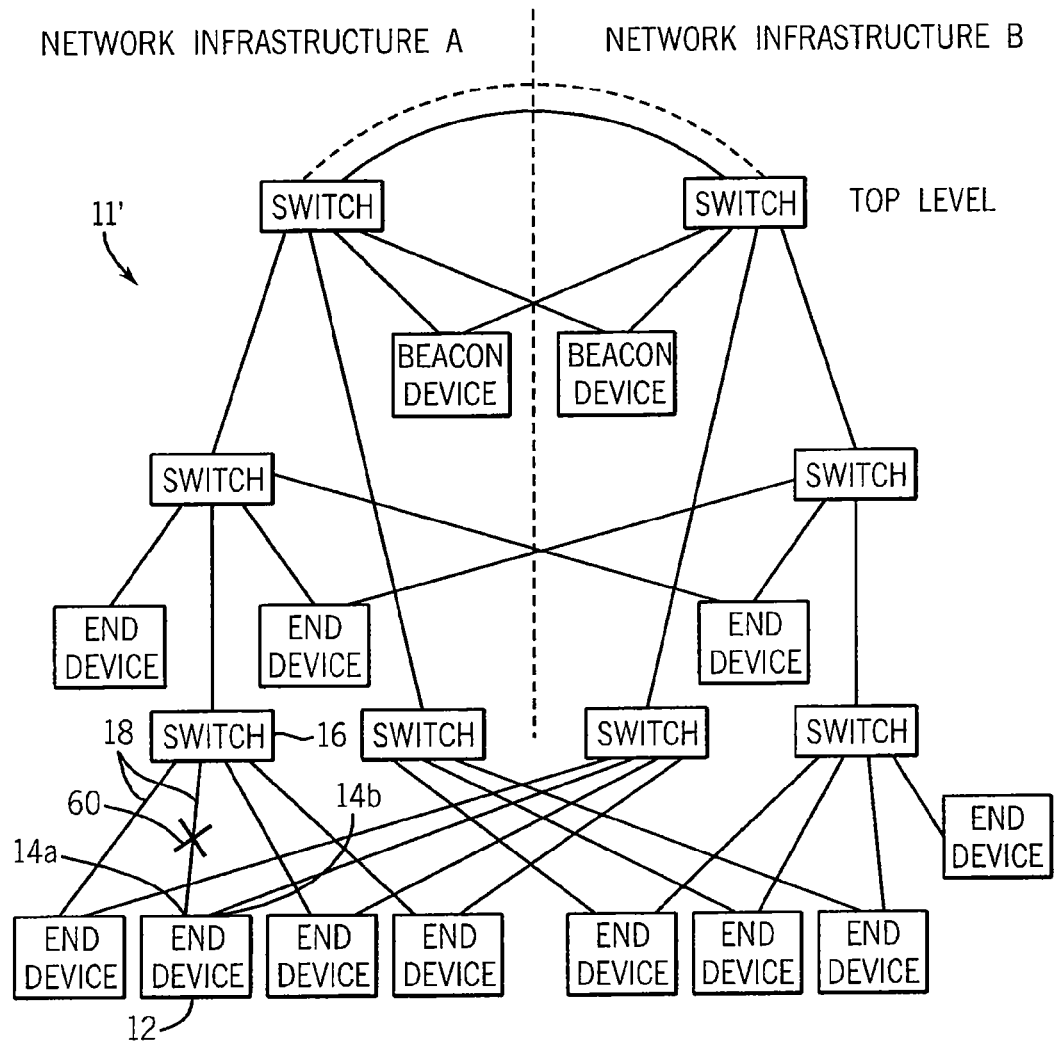
FIG. 4 is a figure similar to that of FIG. 3 showing a single local fault on the network.
Figure 11:
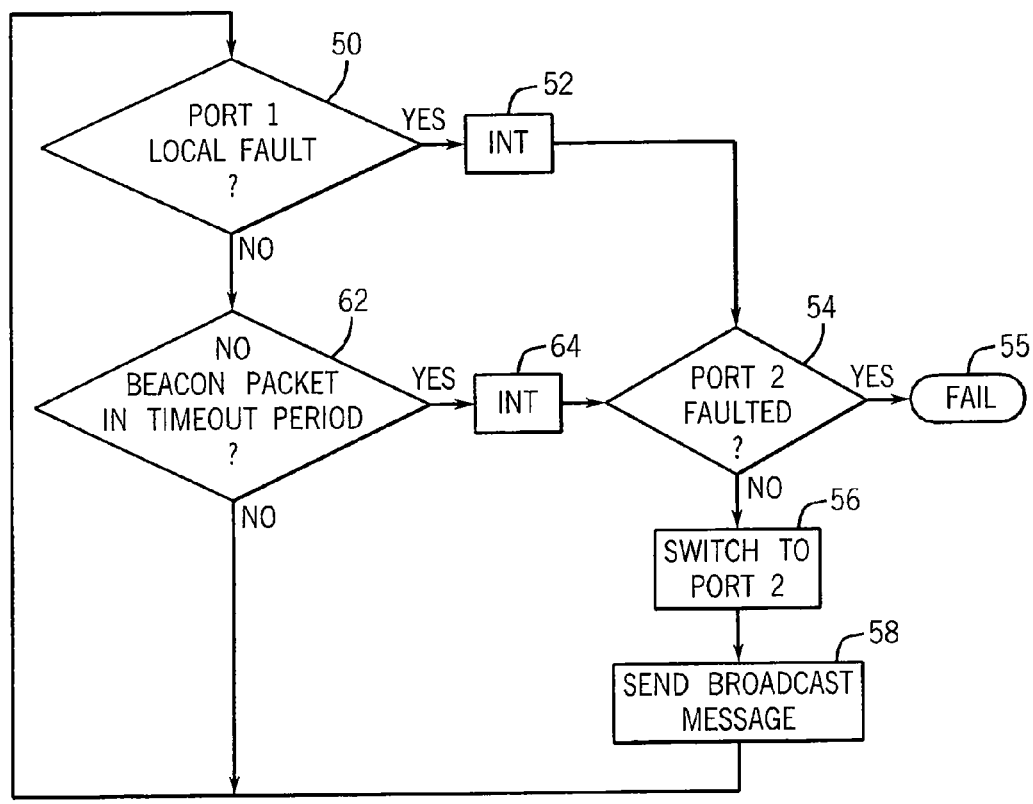
FIG. 11 is flowchart showing operation of the network card of FIG. 2 under fault condition as is implemented in hardware of the communication circuit.

Referring now to FIGS. 2, 4 and 11, a single "local" fault 60 may occur between an end-device 12 and the switch 16 to which it is connected on Network Infrastructure A. This failure may be either in the media 18, forming the connection between device 12 and the switch 16, the connectors connecting the media 18 to the switch 16 or end-device 12 or individual physical layer electrical interfaces of the switch 16 or end-device 12. In this example, it will be assumed that end-device 12 connects through connection 14a and port 22a (the first port) to the switch 16.

As shown in FIG. 11, this fault 60 is detected by the logic circuit 34 as indicated at decision block 50 using standard IEEE 802.3 mechanisms that detect such local connection failures. As indicated by process block 52, detection of the fault 60 causes the Ethernet interface circuit 20 to send an interrupt (indicated by process block 52) to the host microprocessor 28. At decision block 54, the logic circuit 34 determines whether the other port 22b is also faulted (meaning that there is a fault somewhere between it and both of the top-level switches) reflected in a failure to receive beacon packets from either beacon or a local fault. If so, a failure is reported at process block 55 and the network has failed under a double fault condition.

More typically, however, the logic circuit 34 will determine at decision block 54 that the other port 22b has not faulted and the Ethernet interface circuit 20 will switch to port 22b as indicated by process block 56 while disabling port 22a. At succeeding process block 58, the Ethernet interface circuit 20 sends out a short broadcast learning update message that allows for learning by intervening switches.

At this point, the network continues to operate with the end-device 12, however, communicating through connection 14b and port 22b. As discussed above, should port 22a have its fault corrected, communication through port 22a may be resumed.

Figure 5:
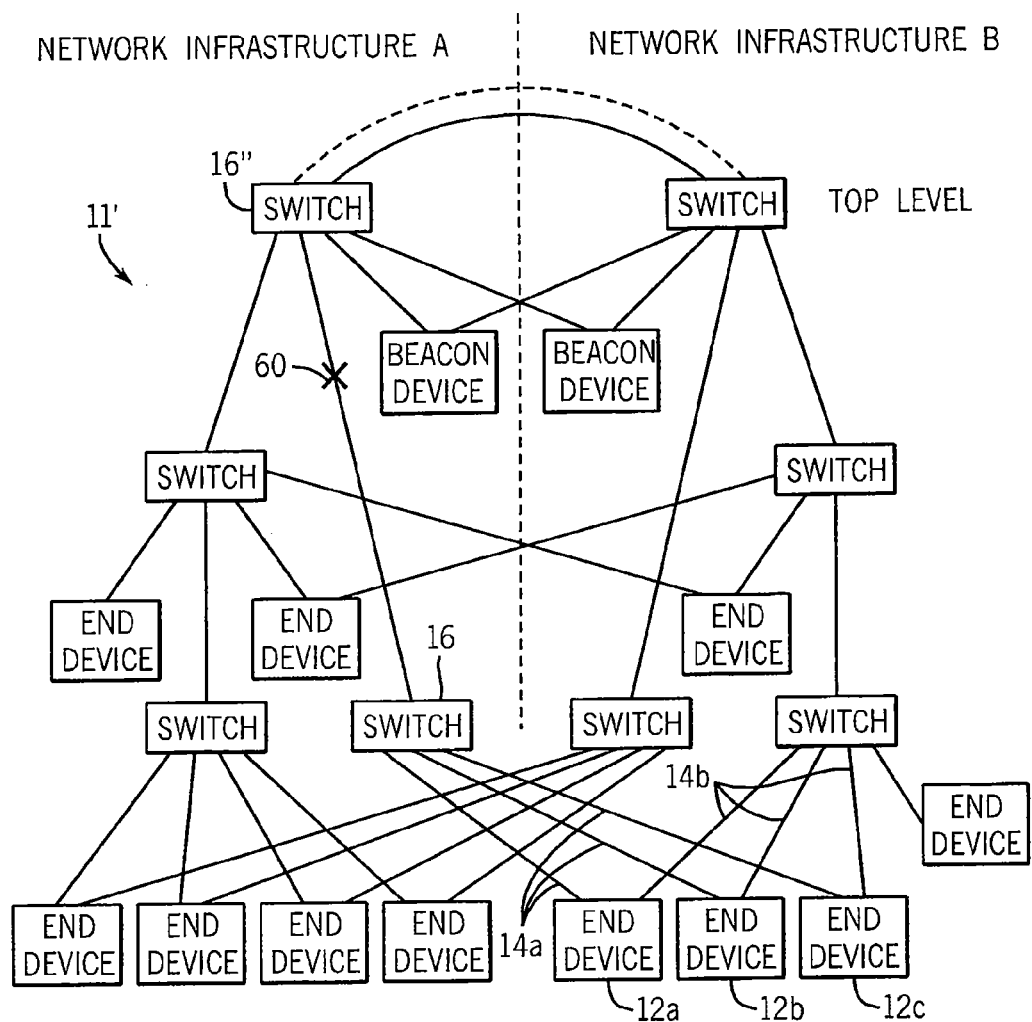
FIG. 5 is a figure similar to that of FIG. 4 showing a single remote fault on the network.

Referring now to FIGS. 2, 5 and 11, in a second case, fault 60 may be located between switch 16 and top-level switch 16', the former switch 16 serving a number of end-devices, 12a-12c. As before, it will be assumed that each of these devices, 12a-12c, communicates with the network 11 via its connection 14a and port 22a at the time of the fault. With this fault, the end-devices 12a-12c cannot directly detect failure per decision block 50 but must deduce a remote failure from the missing beacon packets normally passing through switch 16 per decision block 62 when no beacon packet is received within predefined timeout period. When such a remote fault is detected, the logic circuit 34 proceeds to process block 64 and an interrupt is sent to the host microprocessor 28 causing again the ports to switch from port 22a-22b per process blocks 54, 56, and 58 for each of the end-devices 12a through 12c.

Figure 6:
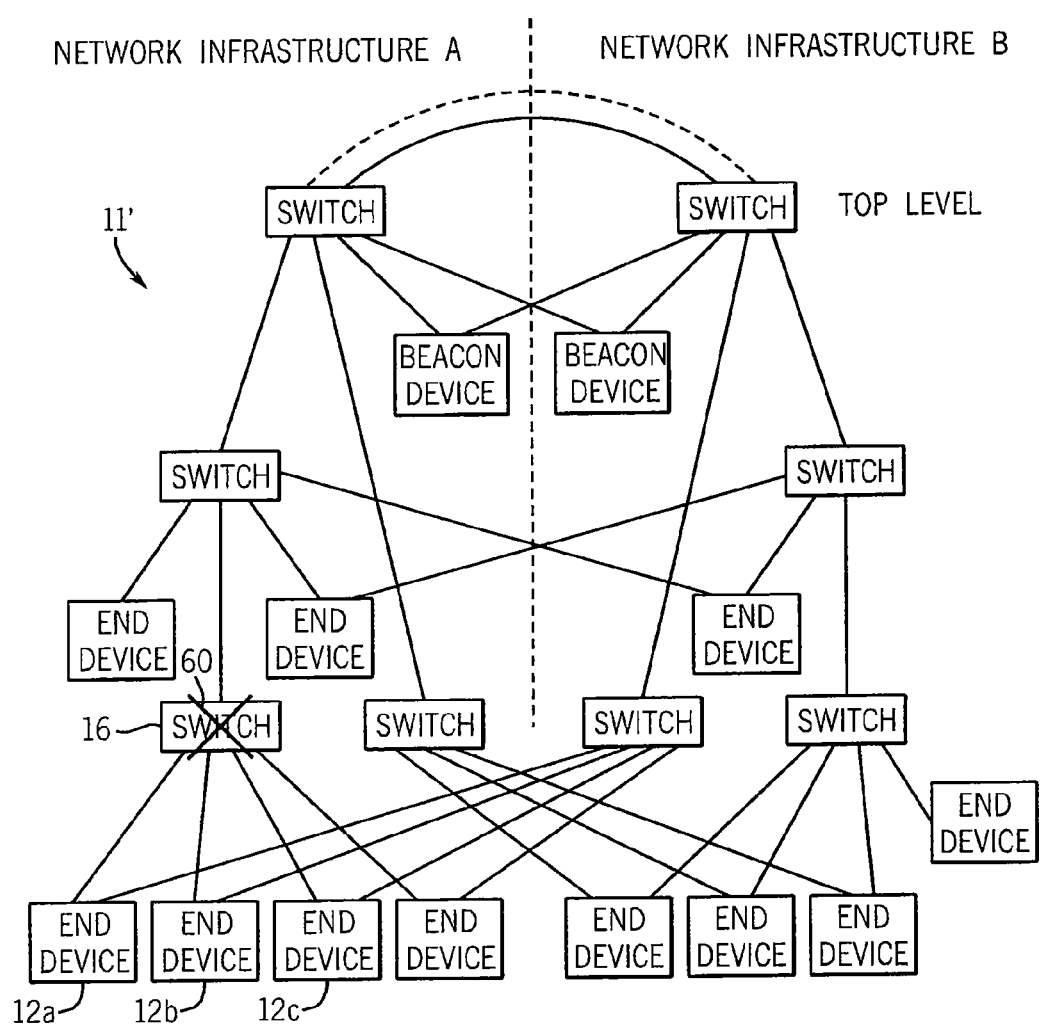
FIG. 6 is a figure similar to that of FIG. 5 showing switch failure.

Referring now to FIGS. 2, 6 and 11, a fault on a switch 16 connected directly to end-devices 12a, 12b and 12c internal to the switch may not be detectable as a local fault per decision block 50 through IEEE 802.3 standard mechanisms; however, it will be detected by loss of the beacon packets as described above per decision block 62. The logic circuit 34 proceeds to process block 64 and an interrupt is sent to the host microprocessor 28 causing again the ports to switch from port 22a to 22b per process blocks 54, 56, and 58 for each of the end-devices 12a through 12c. It should be noted that if the fault were to occur on a top-level switch 16' or 16" all of the end-devices 12 would switch over to Network Infrastructure B and the system would continue to operate.

Figure 7:
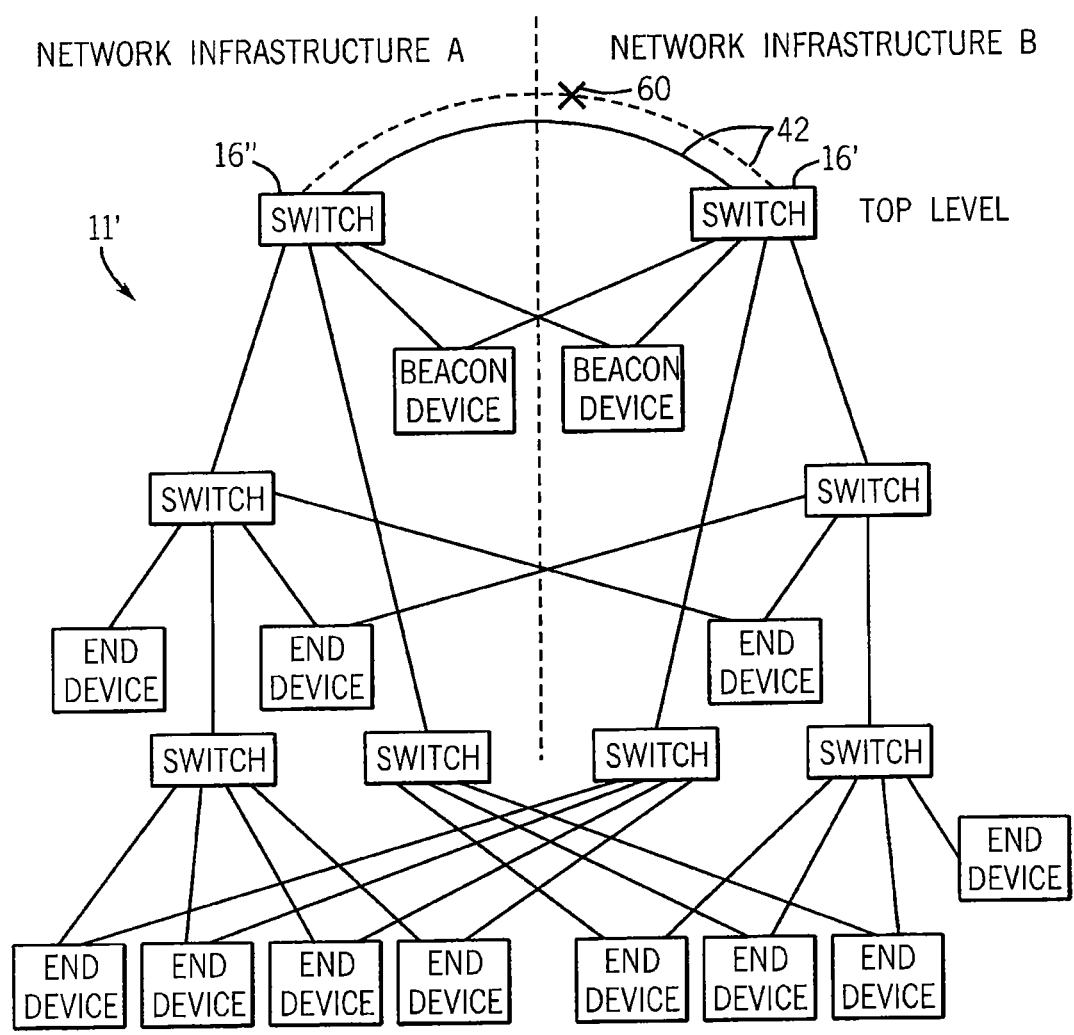
FIG. 7 is a figure similar to that of FIG. 6 showing an interconnection failure between backbone switches.

Referring now to FIGS. 2, 7, and 11, a fault 60 may occur on the network backbone 42. Such a fault is handled by the link aggregation procedure described above being a standard portion of the IEEE 802.3.

Figure 8:
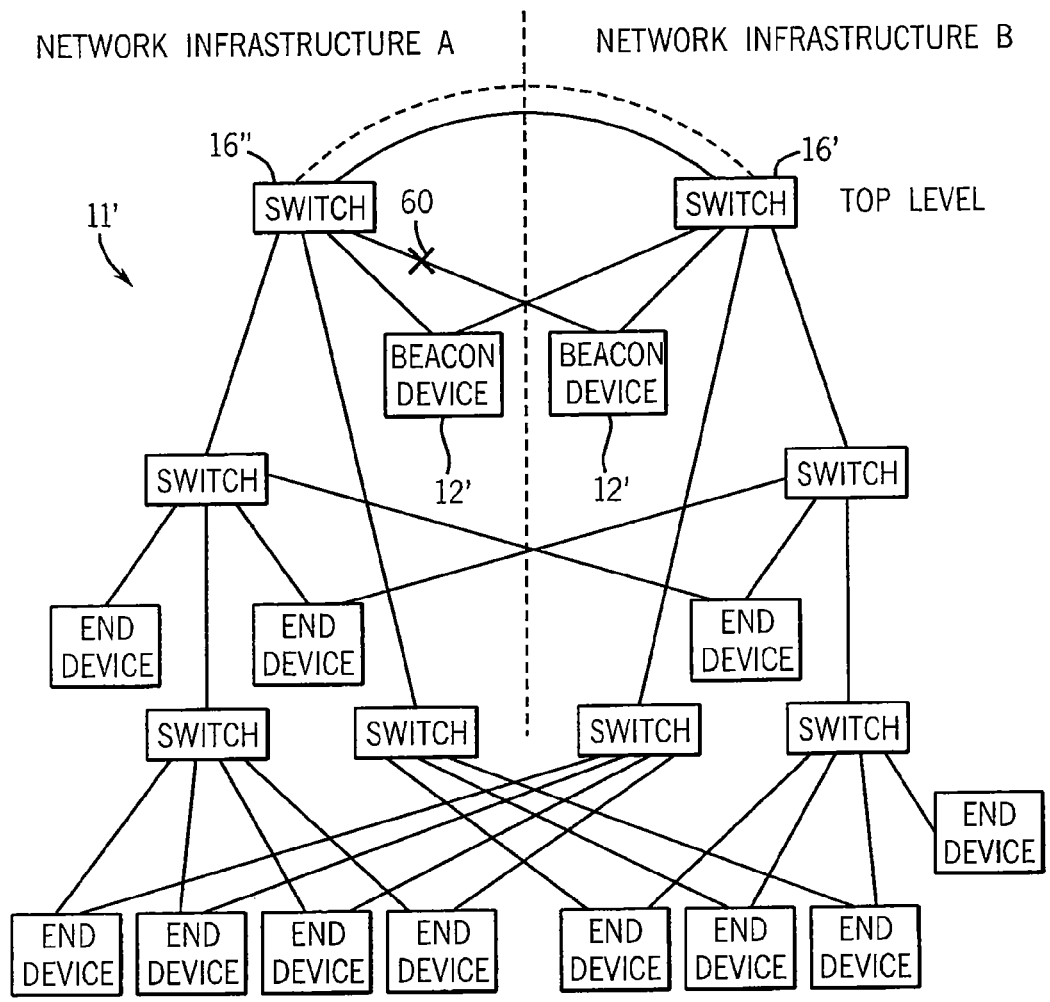
FIG. 8 is a figure similar to that of FIG. 7 showing a local failure affecting a beacon.

Referring now to FIGS. 2, 8 and 11, a single fault may occur between a beacon end-device 12' and a top-level switch 16" of the backbone. Because the fault is on the immediate link to the beacon end-device 12' and the top-level switch 16", the beacon end-device 12' will detect it immediately per decision block 50 and begin transmitting to switch 16'. The switch 16' will relay beacon signals through switch 16" to Network Infrastructure A.

Figure 9:
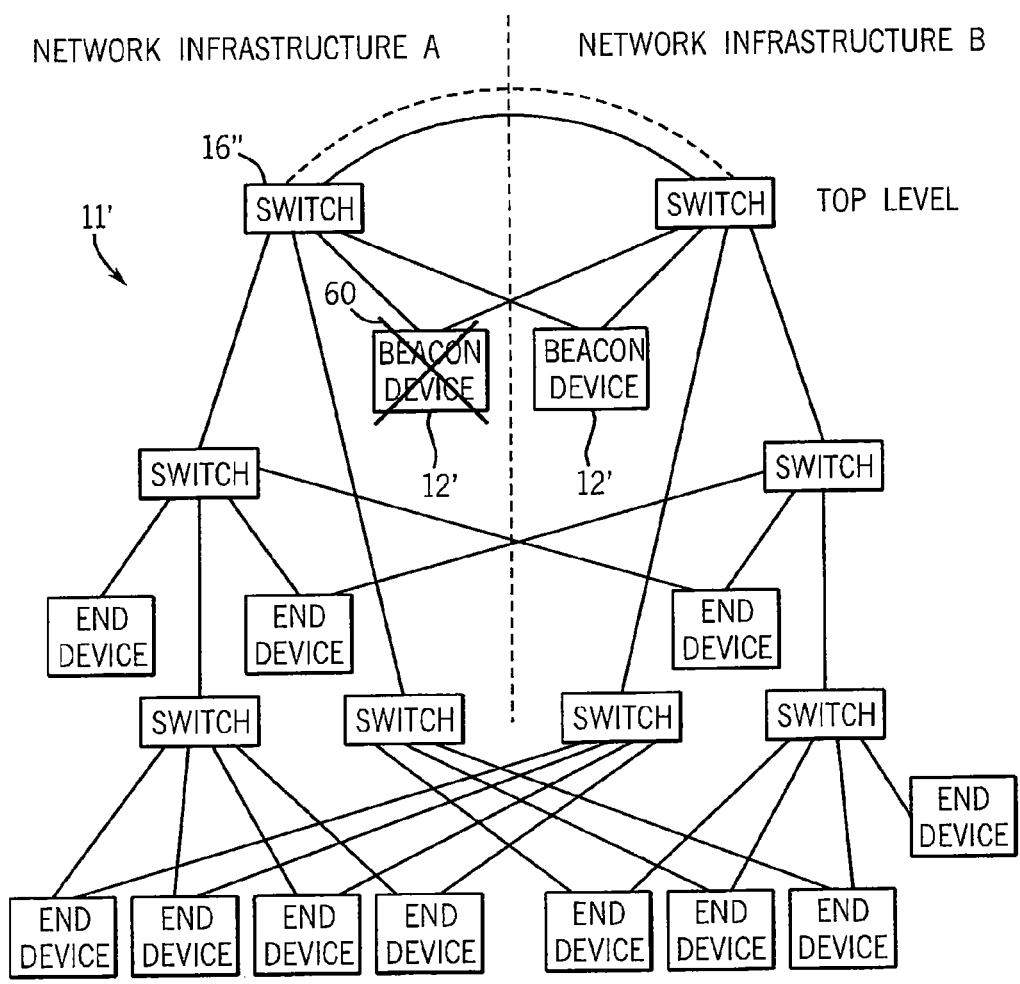
FIG. 9 is a figure similar to that of FIG. 8 showing failure of a beacon.

Finally, as shown in FIGS. 2, 9 and 11, beacon end-device 12' communicating with switch 16" may itself fail. Because the other beacon end-device 12' is still active, however, the system will continue to operate without any problems, with beacon packets being transmitted, for example, from beacon end-device 12' to switch 16' then to switch 16" for distribution over the Network Infrastructure A.

Figure 10:
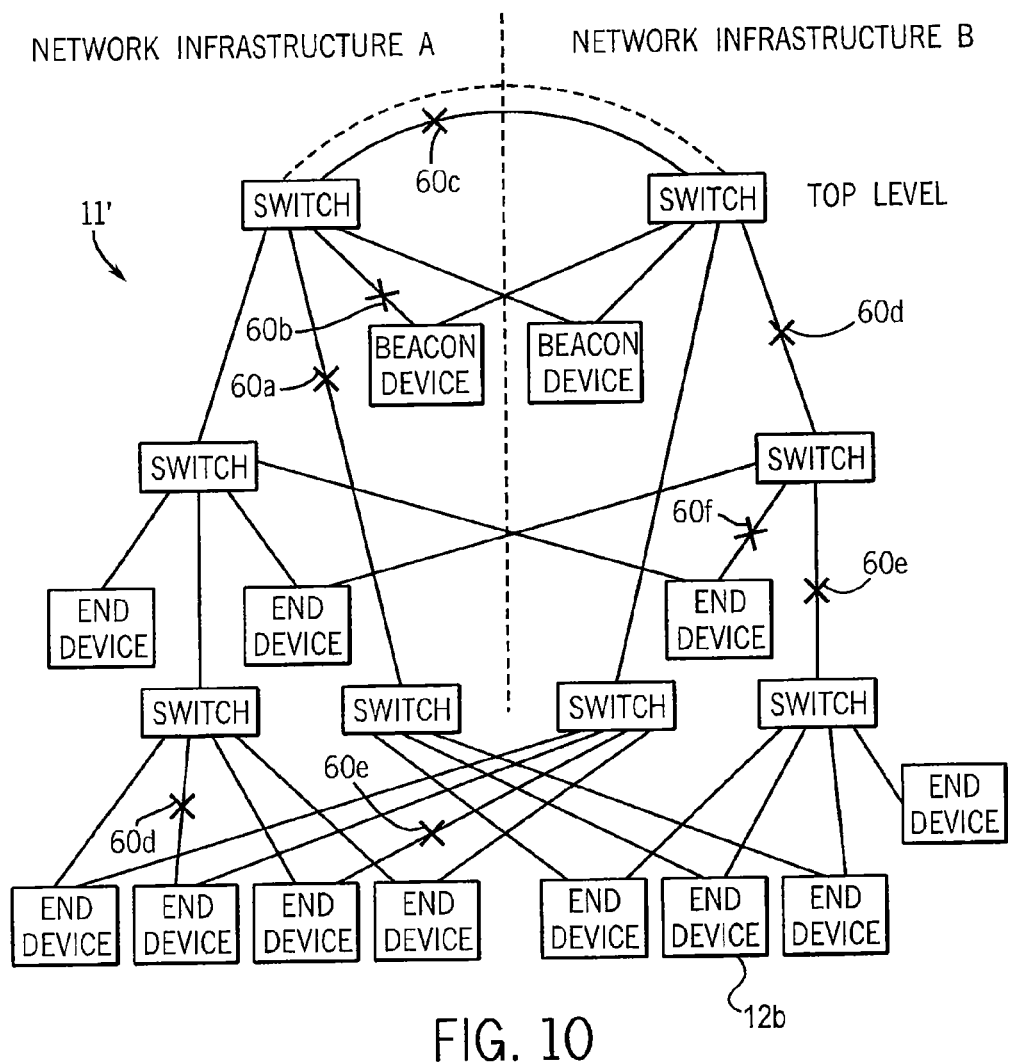
FIG. 10 is a figure similar to that of FIG. 9 showing multiple faults.

Referring to FIGS. 2, 10 and 11, it will be understood from the above description that the present invention can handle all single faults and all combinations of multiple single faults with 60a-60f as shown being one such combination.

Figure 12:
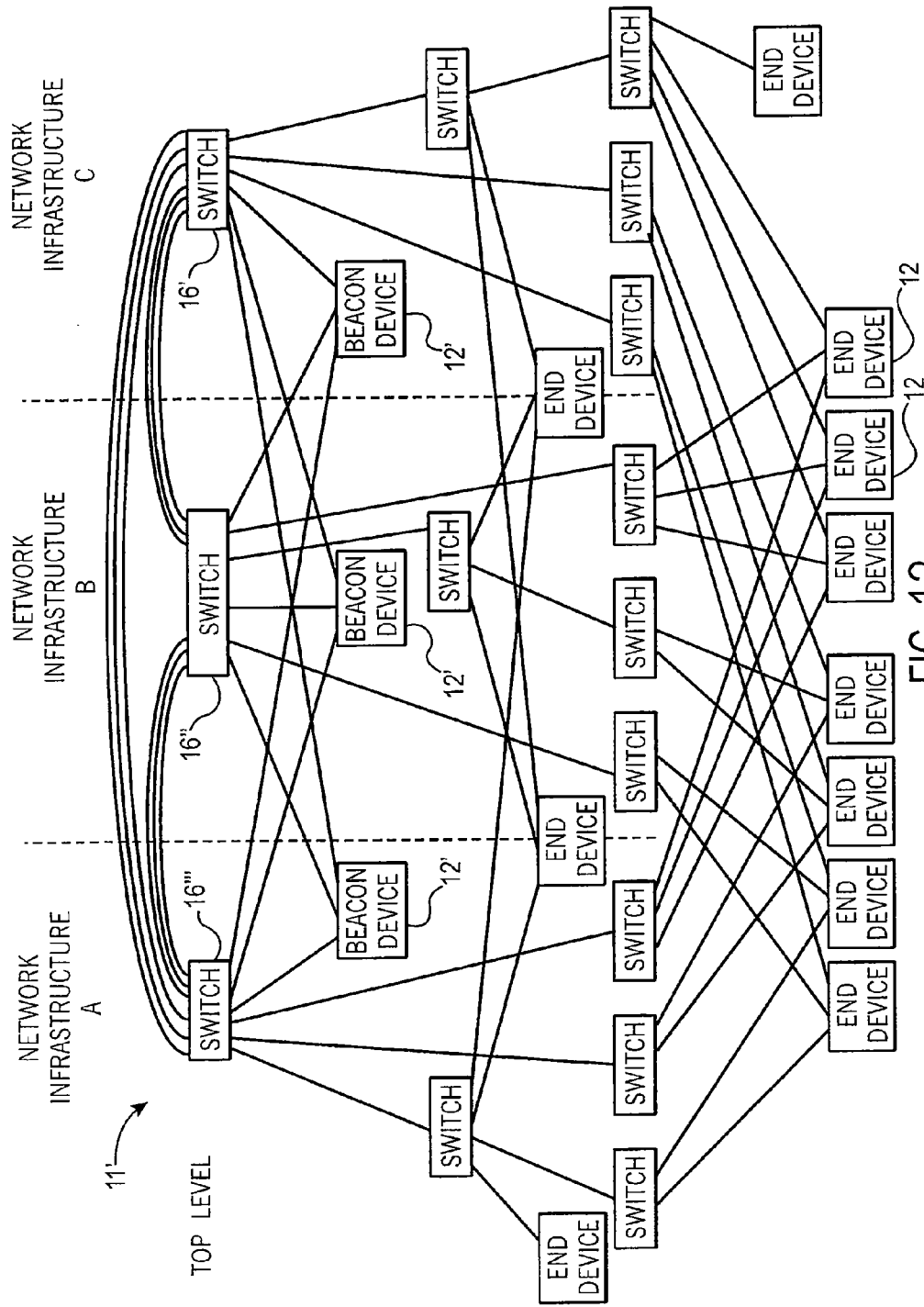
FIG. 12 shows a fragmentary view similar to that of FIG. 10 of an extension of the above concept to provide multiple redundancy.

Referring now to FIG. 12, the present invention has been described for clarity with respect to two Network Infrastructures A and B; however, as will be understood from the above description, the invention can be readily expanded to an arbitrary number of networks infrastructures, for example, a Network Infrastructure A, B and C having top-level switches 16', 16" and 16'" and three beacon end-devices 12' associated with each infrastructure division. Again this network 11' is a single network with each end-device 12 having a unique address on the network. With three network infrastructures, all single faults, all double faults and all combinations of multiple single and double faults can be tolerated.

It would be understood from this description that forwarding of multicast packets in switches 16 could be affected by IGMP snooping and filtering. Accordingly, if IGMP snooping and filtering is turned on, the switches 16 in the system will have invalid knowledge after reconfiguration of an end-device changing port 22a and 22b. This will cause multicast packets to be forwarded to the wrong ports and reconfigured ports will not receive those packets. For this reason, as described above, IGMP snooping and filtering is turned off in switches 16.

Unicast packets are affected by learning and filtering features that may be incorporated into the switches 16. After a reconfiguration (i.e., switching from ports 22a to 22b), switches 16 will have invalid knowledge. Nevertheless, a switch 16, implementing learning correctly, will update its database when a packet with a learned MAC address in a source field is received on a different port from the learned port stored in the database. For this reason, as noted above, when an end-device 12 reconfigures its ports, it sends out a short broadcast learning update message per process block 58 of FIG. 11. This broadcast packet is of no interest to other end-devices and will be dropped.

Some switches 16 also provide configurable aging mechanisms for learned addresses. This feature may also be used as a fallback mechanism to facilitate rapid reconfiguration.

II. Improvement of the Present Invention

Referring momentarily to FIG. 10, an additional network failure indicated by either fault 60d or 60e, in addition to the network failures described previously with respect to failures 60a-60c, can produce a dual fault situation in which a given end-device 12b no longer receives network communication.

Figure 13:
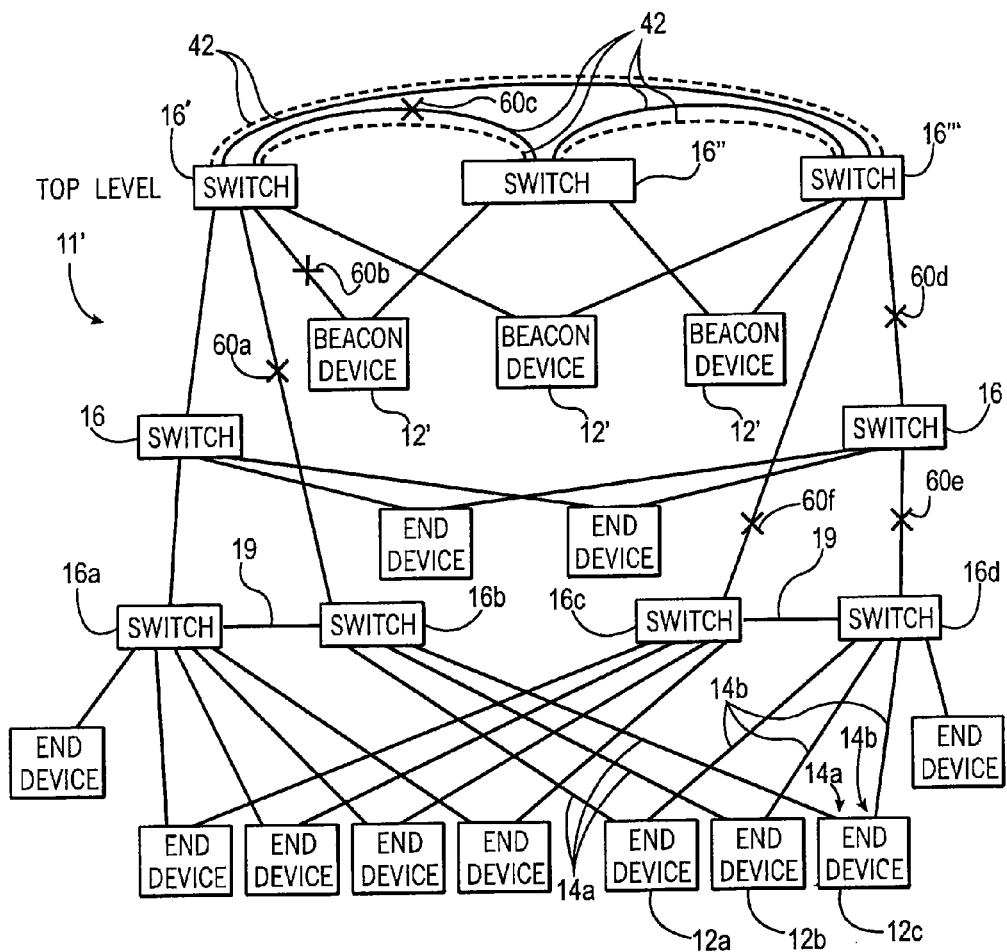
FIG. 13 is a figure similar to that of FIG. 12 showing a system of the present invention to handle multiple faults without increasing the input ports on the end-devices.

Referring to FIG. 13, such a failure mode can be avoided without increasing the number of connections 14 on the end-devices 12 (as shown in FIG. 12 discussed above) by adding a top-level switch 16''' together with corresponding backbone 42 among the top-level switches 16', 16" and 16'''. Thus, top-level switch 16' may be connected by backbone 42 to switches 16" and switches 16''', while switch 16" is connected by backbone 42 to both switch 16' and switch 16''' leaving switch 16''' to be connected by backbone 42 to switch 16' and switch 16".

An additional beacon device 12 (also with two connections 14) may be added providing three beacon devices 12' each communicating with different pairs of the switches 16'-16'''.

The ability to avoid adding a third port to the end-devices 12 is provided by interconnection between a lowest level of switches 16a-16d connected directly to end-devices 12. These switches 16a-16d are pairwise cross connected to each other with connections 19 so that switch 16a and 16b communicate with mutually exclusive sets of the end-devices 12 and communicate with each other, and switches 16c and 16d also communicate with mutually exclusive sets of the end-devices 12 and communicate with each other.

In the example of FIG. 10, the errors 60a-60e may be accommodated for end-device 12b through data passed from switch 16" to switch 16a (through an intervening switch 16) to avoid fault 60a, and then to switch 16b over connection 19 which may transmit to end-device 12b formally excluded from the network. These multiple errors are handled without increasing the number of connections 14 on the end-devices and thus greatly decreasing the cost of implementing this additional level of protection which allows a network to continue with one error and still have margin for recovery if an additional error occurs.

Figure 14:
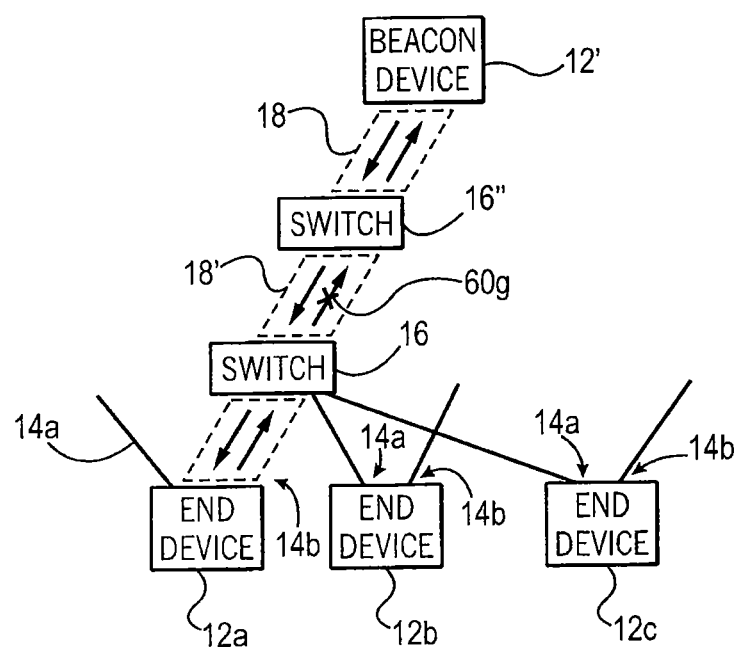
FIG. 14 is a fragmentary view of a signal chain between a beacon and an end-device per the network of FIG. 2 or 13 showing a unidirectional fault.

Referring now to FIG. 14, the present inventors have recognized that a particular end-device 12a may receive a signal from a beacon 12', even if there is a network failure in the network communicating between beacon 12' and end-device 12a, if that failure affects only one direction of network communication as indicated by uni-directional fault 60g, for example, in a network link 18' (between switch 16" and switch 16b. Because this uni-directional fault 60g affects only network data transmitted from the end-device 12a toward the beacon 12' it does not cause a loss of beacon signal or otherwise indicate a failure.

Generally, there is no need for the end-devices 12 to communicate with the beacons 12 during normal operation, however, this direction of data flow is critical to information transferred between switches 16 and thus failure to receive data from the end-devices 12 to the beacons 12 provides a proxy for other critical failures between any two end-devices 12.

Accordingly, each end-device 12 may implement protocol steps (for example in firmware of logic circuit 34), in addition to that described above with respect to FIG. 11, used to identify these unidirectional faults 60g. To the extent that this protocol may only be executed with the active connection 14, which may or may not be communicating along the path revealing unidirectional faults 60g, this routine also periodically swaps connections 14 even in the absence of a triggering fault.

Figure 15:
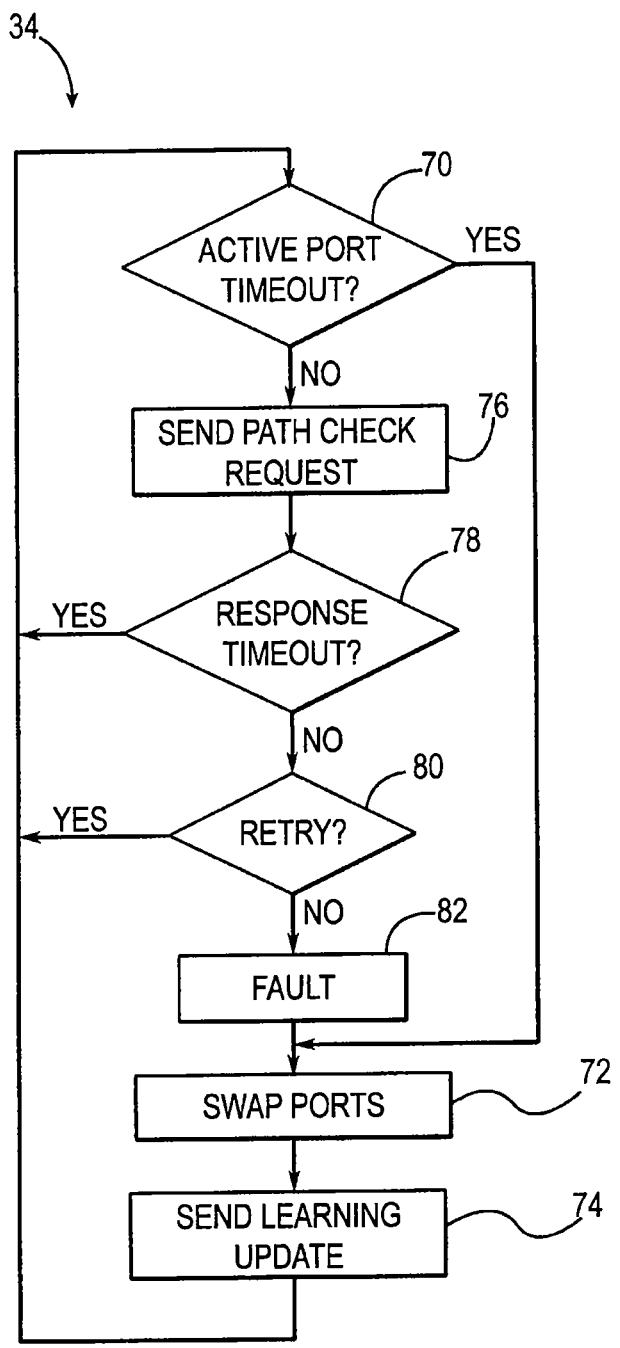
FIG. 15 is a flowchart showing operation of the network card of FIG. 2 in responding to a unidirectional fault condition as implemented in the hardware of communication circuit.

Referring now to FIG. 15, at a first decision block 70 of this protocol, it is determined whether a timer providing a periodic switching of the active connection 14 has expired, and if so, the program proceeds to process block 72 and switches from connection 14a, if active, to connection 14b, or from connection 14b to connection 14a, if connection 14b was active. The period of this timer is typically much longer than the period of the beacon signal.

The switching process of process block 72 changing the active connection 14 is otherwise identical to the switching between connections 14 in the event of a fault and described above. In particular, the switching will trigger a sending of learning update packets, indicated by process block 74, after which the program returns to decision block 70. As is understood in the art, the learning update packets instruct network infrastructure switches 16, 16a-d, 16', 16" and 16''' to update their routing tables to accommodate the different paths associated with connections 14a and 14b.

If the active time for the connection 14 has not expired at decision block 70, then the protocol proceeds to process block 76 in which the active connection 14 transmits a "path check request" message to one of the beacon devices 12 with which it is communicating. The "path check request" message may be any message arranged in advance to indicate this function. As there will typically be multiple beacons 12 communicating with a particular end-device 12, the protocol selects a different target beacon device to receive the path check request on a periodic basis at process block 76, for example, using a round-robin technique.

If a path check response message from the beacon device 12 is obtained as indicated by decision block 78, the program loops back again to decision block 70. Otherwise, at decision block 80, it is determined whether a predetermined number of retries of the path check request transmission of process block 76 has been performed. If not, the program loops back to decision block 70 so that additional retries to other beacon devices 12 can be performed. On the other hand, if the allotted number of retries has been exhausted, an error condition is indicated at process block 82 and the ports are swapped at process block 72 as described above.

Figure 16:
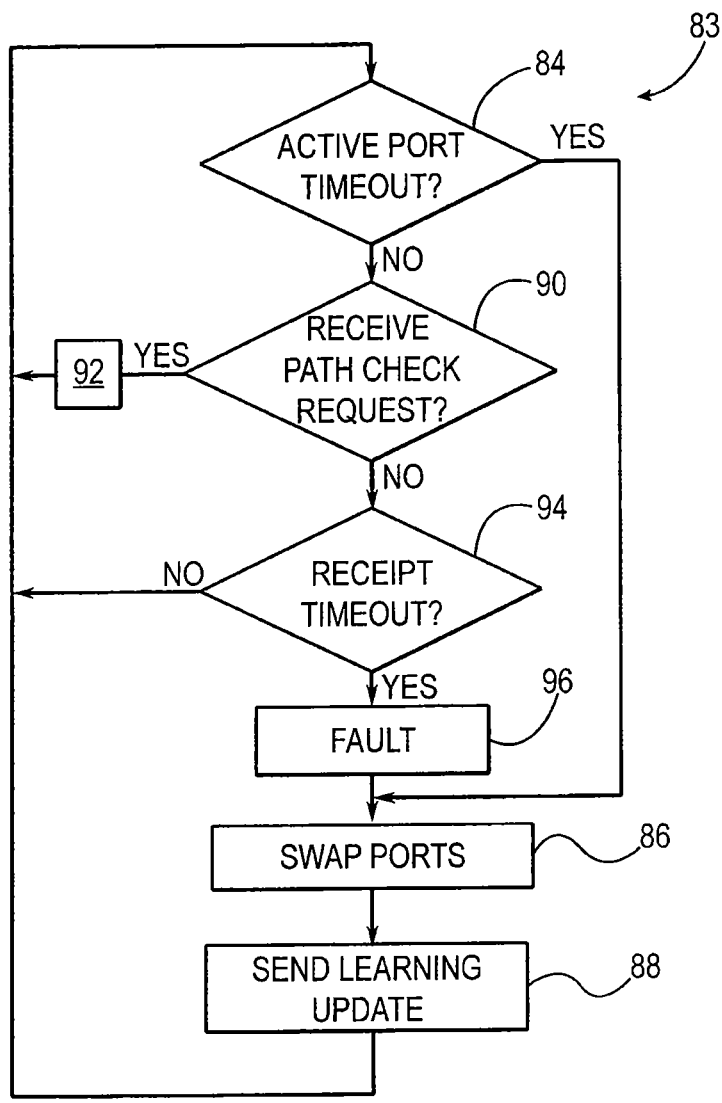
FIG. 16 is a flowchart showing operation of the beacon of FIG. 2 in responding to a uni-directional fault as implemented in the circuitry of the beacon device.

Referring now to FIG. 16, a similar error checking protocol will be performed by each beacon device 12 as indicated by program 83 executed by the beacon 12 (for example in firmware of the logic circuit 34 of the beacon device 12). A first step of this protocol, indicated by decision block 84, checks an active port timer to determine whether periodic switching of the connection 14 of the beacon device 12 should occur in a process analogous to decision block 70 shown in FIG. 15. If the connection 14 is due for a change, the program proceeds to process block 86 to cause a switching of the connection 14 in a manner of process block 72 of the end-device 12, and then proceeds to process block 88 to transmit a learning update message in a manner similar to that of process block 74, however, as transmitted from the beacon device 12.

If the active port timer of decision block 84 has not expired, then the program proceeds to decision block 90 to determine if it has received a path check request from an end-device 12. If so, a path check response is transmitted as indicated by process block 92, and the program returns to decision block 84. If not, at decision block 94 it is determined whether no path check request has been received for a predetermined time interval.

If the predetermined time interval checked in decision block 94 has not expired, the program proceeds back to decision block 84, otherwise a fault condition is indicated as shown by process block 96 and the program then proceeds to process block 86 and 88 described before.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

It will be appreciated that much of the functionality ascribed to the host processor and the communication circuit may be freely allocated among these two devices and in fact both devices may be implemented by sufficiently powerful integrated circuit or microprocessor. The design of the beacon devices may essentially mirror that of the end-devices 12 with respect to hardware.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

We claim:

1. A fault-tolerant industrial control device comprising:
   a host processor providing data to be communicated between the control device and an industrial control network;
   a network communication circuit communicating between the host processor and at least two ports on the control device using a single MAC address and connectable to different network media of the industrial control network that may lead to different switches, the communication circuit switchably connecting the host processor from a first of the ports to a second of the ports upon occurrence of a fault affecting a first of the ports without changing the MAC address;
   wherein both ports detect network-level faults by monitoring regular beacon messages from at least one beacon device communicating on the industrial control network with the control device;
   wherein the network communication circuit further periodically transmits a path check request message to the beacon device and triggers the fault if a responding path check response is not received from the beacon device in a predetermined interval.

2. The fault tolerant industrial control device of claim 1 wherein the network communication circuit further transmits a broadcast learning update message from an active port after a fault, the learning update message indicating to other devices on the industrial control network that their routing tables should be updated.

3. The fault tolerant industrial control device of claim 1 wherein the network communication circuit receives beacon messages from multiple beacon devices, and the network communication circuit changes the target beacon device receiving the periodically transmitted path check request message according to a predetermined sequence.

4. The fault tolerant industrial control device of claim 1 wherein the network communication circuit periodically switches communication between the first port and second port without occurrence of a fault.

5. The fault tolerant industrial control device of claim 1 wherein the network communication circuit periodically transmits the path check request message at a period longer than a period of regular beacon messages from the beacon device.

6. The fault tolerant industrial control device of claim 1 wherein the predetermined interval includes at least two repetitions of the path check request message.

7. The fault tolerant industrial control device of claim 1 wherein the network communication circuit includes a hardware circuit switching between ports.

8. A fault-tolerant Ethernet network comprising:
   a set of end-devices intercommunicating via network connections to network switches through network media;
   wherein at least some of the end-devices have network communication circuits communicating between host processors of the end-devices and at least two ports, the ports of each end-device using a single MAC address provided by the host processor and connected to different network media leading to different switches, the network communication circuit switchably connecting the end-devices to a second of the ports upon occurrence of a fault affecting a first of the ports;

wherein both ports detect network-level faults by monitoring regular beacon messages from at least one beacon device communicating on the network media with the end-device;

wherein the network communication circuit further periodically transmits a path check request message to the beacon device and triggers the fault if a responding path check response is not received from the beacon device in a predetermined interval;

wherein at least two of the switches are designated top-level switches and communicate with each other via a fault-tolerant backbone; wherein each end-device communicates directly or indirectly with a first of the top-level switches via one port and with a second of the top-level switches via the second port and at least two beacon devices transmitting a beacon message over the network media;

wherein each beacon device connects directly to one of the top-level switches;

wherein a fault is detected by an absence of any beacon message within predefined timeout period at a port.

9. The fault-tolerant Ethernet network of claim 8 wherein at least three switches are designated top-level switches and communicate with each other via a fault-tolerant backbone; wherein each end-device has only two ports, a first port of which communicates directly or indirectly with a first of the top-level switches and a second port of which communicates with a second of the top-level switches via the second port and
at least three beacon devices transmitting a beacon message over the network media; each beacon device connected directly to one of the top-level switches.

10. The fault-tolerant Ethernet network of claim 9 wherein at least some of the end-devices have a first port of which communicates through a first switch with a first of the top-level switches and a second port of which communicates through a second switch with a second of the top-level switches via the second port; and
wherein the first and second switches communicate directly with each other.

11. The fault-tolerant Ethernet network of claim 10 wherein the top-level switches provide IEEE 802.3 link aggregation capability.

12. The fault-tolerant Ethernet network of claim 9 further including at least three beacon devices transmitting a beacon message over the network media; each beacon device connected directly to at least two top-level switches;
wherein a fault is detected by an absence of any beacon message within predefined timeout period at a port.

13. The fault-tolerant Ethernet network of claim 9 wherein the network communication circuit further transmits a broadcast learning update message from an active port after a fault, the learning update message indicating to other devices on the industrial control network that their routing tables should be updated.

14. The fault-tolerant Ethernet network of claim 9 wherein the network communication circuit receives messages from multiple beacons, the network communication circuit changes the target beacon device receiving the periodically transmitted path check request message according to a predetermined sequence.

15. The fault-tolerant Ethernet network of claim 9 wherein the network communication circuit periodically switches communication between the first port and second port without occurrence of a fault.

16. The fault-tolerant Ethernet network of claim 9 wherein the network communication circuit periodically transmits the path check request message at a period longer than a period of regular beacon messages from the beacon device.

17. The fault-tolerant Ethernet network of claim 9 wherein the predetermined interval includes at least two repetitions of the path check request message.

18. The fault-tolerant Ethernet network of claim 9 wherein the network communication circuit includes a hardware circuit switching between ports.

19. A method of creating a fault-tolerant Ethernet network comprising:
(a) providing a set of end-devices having network communication circuits communicating between host processors of the end-devices and at least two ports, the ports of each end-device using a single MAC address provided by the host processor and connectable to different network media leading to different switches,
(b) connecting the end-devices via network connections to network switches through network media; wherein at least two of the switches are designated top-level switches and communicate with each other via a fault-tolerant backbone; wherein each end-device communicates directly or indirectly with a first of the top-level switches via one port and with a second of the top-level switches via the second port; and
(c) attaching at least two beacon devices to the network, the beacon devices transmitting beacon messages over the network media; each beacon device connected directly to one of the top-level switches; wherein a fault is detected by an absence of any beacon message within a predefined timeout period at a port;
(d) upon occurrence of a fault affecting a first of the ports of any communication circuit, switching the end-device to a second of the ports, wherein a fault is detected by an absence of any beacon message within predefined timeout period at a port; and
(e) periodically transmitting on the network a path check request message from the end-device to the beacon device and triggering a fault if a responding path check response is not received from the beacon device in a predetermined interval.

20. The method of claim 19 wherein the network communication circuit periodically switches communication between the first port and second port without occurrence of a fault.

* * * * *